United States Patent
Kamotani et al.

(10) Patent No.: US 10,412,175 B2
(45) Date of Patent: Sep. 10, 2019

(54) INFORMATION COMMUNICATION APPARATUS AND INFORMATION COMMUNICATION METHOD

(71) Applicant: Panasonic Intellectual Property Management Co., Ltd., Osaka (JP)

(72) Inventors: Yusuke Kamotani, Osaka (JP); Yoshifumi Kawaguchi, Kyoto (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 15/839,922

(22) Filed: Dec. 13, 2017

(65) Prior Publication Data

US 2018/0205798 A1    Jul. 19, 2018

(30) Foreign Application Priority Data

Jan. 13, 2017    (JP) .................................. 2017-003813
Oct. 19, 2017    (JP) .................................. 2017-202285

(51) Int. Cl.
*H04N 7/14* (2006.01)
*H04L 29/08* (2006.01)
(Continued)

(52) U.S. Cl.
CPC ........ *H04L 67/145* (2013.01); *H04L 65/1066* (2013.01); *H04N 7/147* (2013.01); *H04N 7/15* (2013.01)

(58) Field of Classification Search
CPC ... G01S 5/0072; G06F 17/3028; H04L 12/18; H04L 63/102; H04L 63/105;
(Continued)

(56) References Cited

U.S. PATENT DOCUMENTS

| 2006/0203976 A1* | 9/2006 | Erhart | H04M 3/2227 |
| | | | 379/88.01 |
| 2010/0113037 A1* | 5/2010 | Ong | H04L 47/11 |
| | | | 455/445 |

(Continued)

FOREIGN PATENT DOCUMENTS

WO    2009/090967    7/2009

*Primary Examiner* — Khai N. Nguyen (74) *Attorney, Agent, or Firm* — Wenderoth, Lind & Ponack, L.L.P.

(57) ABSTRACT

An information communication apparatus according to an embodiment of the present disclosure includes a sensor acquiring information inside and outside the apparatus, and a connection maintaining unit maintaining a connection for transmitting the information from the sensor to a server connected via a communication network. The connection maintaining unit includes a normal connection maintaining section transmitting the information from the sensor to the server, and an interrupt connection maintaining section transmitting data other than the information from the sensor to the server. If, during continuous transmission of the information from the sensor to the server which is performed by the normal connection maintaining section, the continuous transmission of the information from the sensor becomes impossible, the interrupt connection maintaining section transmits the data other than the information from the sensor to the server, to allow the connection maintaining unit to maintain the connection.

10 Claims, 7 Drawing Sheets

(51) Int. Cl.
*H04L 29/06* (2006.01)
*H04N 7/15* (2006.01)

(58) Field of Classification Search
CPC .............. H04L 65/1066; H04L 65/403; H04L 65/4038; H04L 65/4084; H04L 65/4092; H04L 65/602; H04L 65/604; H04L 65/607; H04L 67/145; H04M 1/72572; H04M 2201/40; H04M 2250/52; H04M 3/4936; H04M 3/5191; H04N 2007/145; H04N 5/272; H04N 7/14; H04N 7/141; H04N 7/142; H04N 7/144; H04N 7/147; H04N 7/148; H04N 7/15; H04N 7/152; H04N 7/155; H04N 7/157; H04N 7/23206; H04W 4/18; H04W 4/185
USPC ......... 348/14.01, 14.02, 14.03, 14.04, 14.05, 348/14.06, 14.07, 14.08, 14.09, 14.1, 348/14.11, 14.12, 14.13, 14.14, 15.15, 348/14.16; 382/275; 379/265.03; 455/414.1, 566; 704/270
See application file for complete search history.

(56) References Cited

U.S. PATENT DOCUMENTS

| | | | |
|---|---|---|---|
| 2010/0271455 A1* | 10/2010 | Sawada | H04N 7/147 348/14.02 |
| 2011/0267420 A1* | 11/2011 | Tanaka | H04L 12/1827 348/14.08 |
| 2011/0279640 A1* | 11/2011 | Choi | H04N 7/148 348/14.12 |
| 2014/0225975 A1* | 8/2014 | Sawada | H04M 1/72522 348/14.01 |
| 2014/0258747 A1* | 9/2014 | Narayan | G06F 1/3287 713/320 |
| 2015/0086184 A1* | 3/2015 | Takamune | H04N 21/44016 386/353 |
| 2015/0113461 A1* | 4/2015 | Kasten | G06F 3/0484 715/771 |
| 2015/0341646 A1* | 11/2015 | Sze | H04N 19/166 375/240.26 |
| 2015/0358578 A1* | 12/2015 | Lee | H04N 7/141 348/14.01 |
| 2015/0358580 A1* | 12/2015 | Zhou | H04N 7/15 348/14.07 |
| 2015/0358582 A1* | 12/2015 | Zhou | H04N 7/15 348/14.07 |
| 2016/0072861 A1* | 3/2016 | Woolsey | H04L 51/046 455/414.1 |
| 2016/0183144 A1* | 6/2016 | Vallabhu | H04W 36/0011 370/331 |
| 2016/0323418 A1* | 11/2016 | Elyashiv | H04L 51/04 |
| 2017/0063703 A1* | 3/2017 | Mani | H04L 47/25 |
| 2017/0287433 A1* | 10/2017 | Majid | G09G 5/003 |

* cited by examiner

INFORMATION COMMUNICATION APPARATUS AND INFORMATION COMMUNICATION METHOD

BACKGROUND

1. Technical Field

The present disclosure relates to an apparatus that communicates information such as video or audio acquired by a sensor on a terminal.

2. Description of the Related Art

Improvements in sensor performance and arithmetic operation performance of portable terminals, represented by smartphones, have enabled the portable terminals to execute applications having a streaming function of transmitting video and audio taken by the portable terminals in real time.

The streaming function requires a negotiation process before actually starting transmission and reception of video information and audio information. The negotiation process includes a process of verifying that a transmission side and a reception side are both authenticated, a process of checking the data format of the video information and the audio information, and a process of allocating one or more communication ports required for transmission and reception of the video information and the audio information.

Communication speed varies depending on the environment. Patent Literature 1 discloses a communication terminal that provides a video telephone function and a voice call function even when sufficient communication speed is not available. This communication terminal switches the video telephone function to the voice call function if the communication condition is not sufficient to carry out video telephone communication. At this time, the reception-side communication terminal displays, on its display unit, an image that was acquired from the transmission-side communication terminal when video telephone communication was carried out, as a still image.

CITATION LIST

Patent Literature

PTL 1: International Publication No. 2009/090967

SUMMARY

As with the communication terminal disclosed in Patent Literature 1, even when a smartphone is equipped with a camera device and a microphone device, the camera device and the microphone device are not always available during streaming Because the smartphone is not an exclusive apparatus for streaming, a process such as incoming call reception or alarm sounding occurs as an interrupt in some cases, which may override a streaming application process. For this reason, at the time of such an interrupt, the camera device or the microphone device may not be available from a streaming application. In such cases, the streaming cannot be continued, so the streaming connection is terminated, and the streaming function is ended. In order to resume the streaming after the interrupt is completed, it is necessary to start the negotiation process again. The present disclosure provides an information communication apparatus that, when an interrupt occurs in the information communication apparatus such as a smartphone, is able to resume transmission after completion of the interrupt.

An information communication apparatus according to an embodiment of the present disclosure includes a sensor acquiring information inside and outside the apparatus, and a connection maintaining unit maintaining a connection for transmitting the information from the sensor to a server connected via a communication network. The connection maintaining unit includes a normal connection maintaining section transmitting the information from the sensor to the server, and an interrupt connection maintaining section transmitting data other than the information from the sensor to the server. If, during continuous transmission of the information from the sensor to the server which is performed by the normal connection maintaining section, the continuous transmission of the information from the sensor becomes impossible, the interrupt connection maintaining section transmits the data other than the information from the sensor to the server, to allow the connection maintaining unit to maintain the connection.

An information communication method according to an embodiment of the present disclosure includes an acquisition step of acquiring information inside and outside an apparatus, and a connection maintaining step of maintaining a connection for transmitting the information acquired in the acquisition step to a server connected via a communication network. The connection maintaining step includes a normal connection maintaining step of continuously transmitting the information acquired in the acquisition step to the server, and an interrupt connection maintaining step of transmitting data other than the information acquired in the acquisition step to the server. If the continuous transmission of the information acquired in the acquisition step becomes impossible in the normal connection maintaining step, the data other than the information acquired in the acquisition step are transmitted to the server in the interrupt connection maintaining step, to maintain the connection in the connection maintaining step.

The information communication apparatus according to the present disclosure maintains a connection with the server and continues communication even when an interrupt such as incoming call reception occurs, and therefore, it is not necessary to execute a negotiation process again when the interrupt completes. Therefore, it is possible to resume the original transmission quickly after the interrupt ends.

DESCRIPTION OF EMBODIMENTS

Hereinbelow, exemplary embodiments will be described in detail with reference to the drawings. However, unnecessarily detailed description may be omitted. For example, detailed description of well-known matters and repetitive description of substantially the same structures may be omitted. This is to prevent the following description from becoming redundant and to facilitate understanding for those skilled in the art.

It should be noted that the appended drawings and the following description are provided for those skilled in the art to sufficiently understand the present disclosure, and they are not intended to limit the subject matter set forth in the claims.

First Exemplary Embodiment

Hereinbelow, a first exemplary embodiment will be described with reference to FIGS. 1 to 7.

1-1. Configuration 1-1-1. Network Connection Configuration

Figure 1:
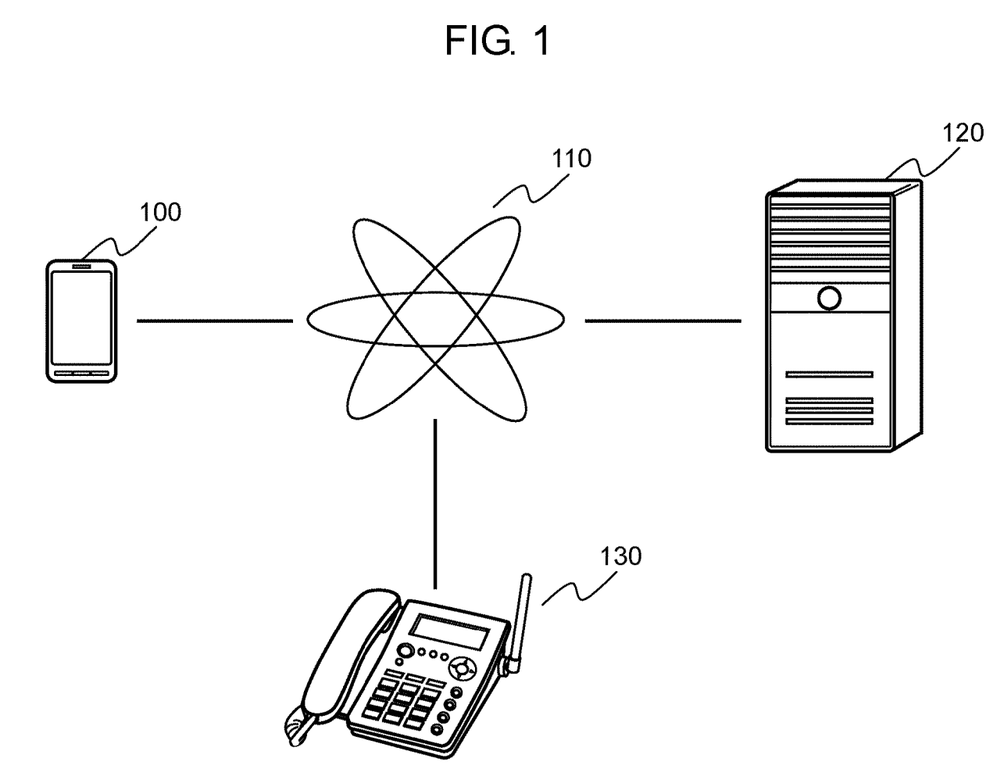
FIG. 1 is a schematic view illustrating a network connection with a portable terminal according to a first exemplary embodiment.

FIG. 1 is a schematic view illustrating a network connection with a portable terminal according to the first exemplary embodiment. Portable terminal 100 is connectable with server 120 via communication network 110. Portable terminal 100 executes a streaming transmission application that transmits video and audio taken by portable terminal 100 itself to server 120, and server 120 receives video information and audio information that are transmitted from the streaming transmission application. Telephone 130 is capable of making a phone call with portable terminal 130 via communication network 110. Portable terminal 100 is capable of receiving an incoming phone call from telephone 130 as an interrupt process even while executing the streaming transmission application. Portable terminal 100 is an example of the information communication apparatus.

It should be noted that the communication network that connects portable terminal 100 and server 120 may be different from the communication network that connects portable terminal 100 and telephone 130 to each other.

Hereinbelow, exemplary embodiments of a portable terminal as the information communication apparatus according to the present disclosure will be described with reference to the drawings.

1-1-2. Configuration of Portable Terminal

Figure 2:
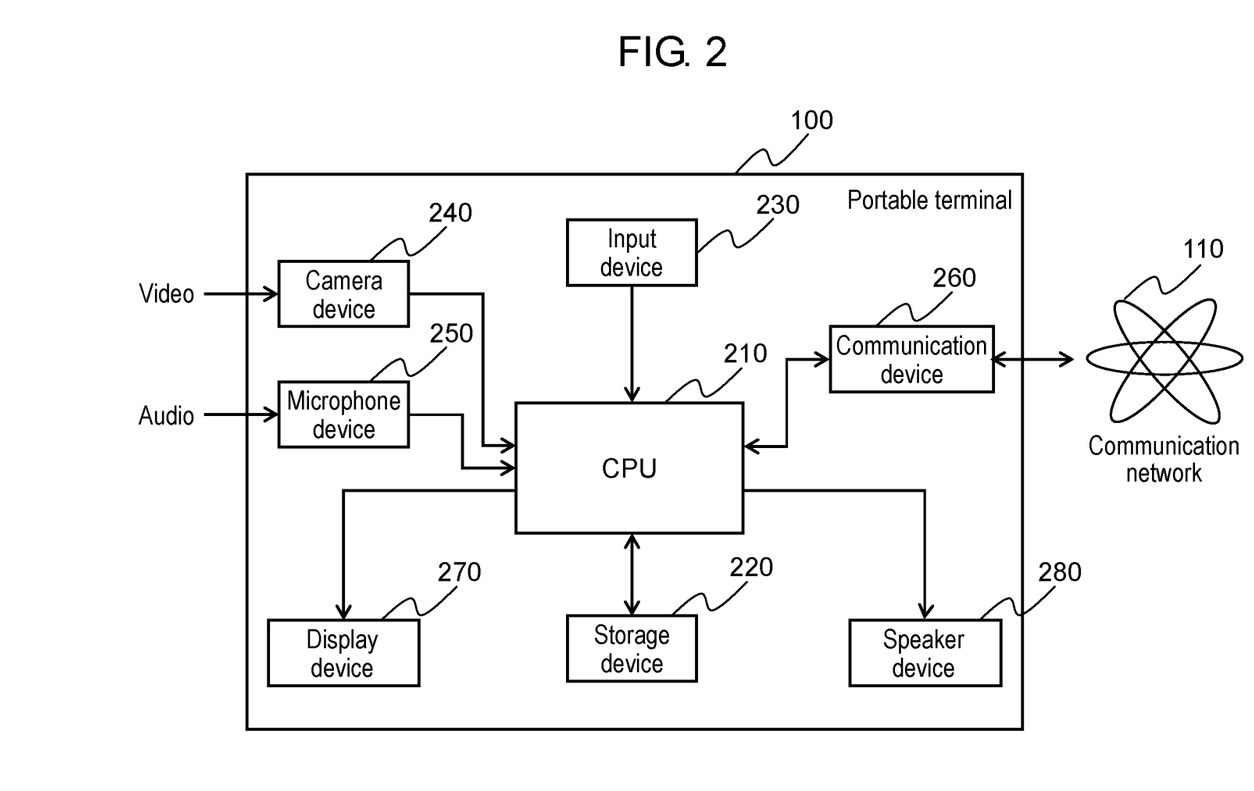
FIG. 2 is a block diagram illustrating the configuration of the portable terminal according to the first exemplary embodiment.

The configuration of portable terminal 100 according to the first exemplary embodiment will be described with reference to FIG. 2. FIG. 2 is a block diagram illustrating the configuration of portable terminal 100. In the present exemplary embodiment, portable terminal 100 carries out streaming transmission to server 120 and a phone call with telephone 130.

CPU 210 performs arithmetic operations based on the information that is input from various devices, and transmits instructions to the devices based on the results of the arithmetic operations. CPU 210 also executes applications stored in later-described storage device 220.

Input device 230 is operated by a user so as to control operations concerning portable terminal 100.

Portable terminal 100 includes camera device 240 and microphone device 250 each serving as a sensor.

Camera device 240 acquires video outside portable terminal 100 and transmits the video information to CPU 210. The transmitted video information is compressed by CPU 210 and is stored in later-described storage device 220. It is also possible that the transmitted video information may be compressed by CPU 210 and may be transmitted to communication network 110 by later-described communication device 260.

Microphone device 250 acquires audio outside portable terminal 100 and transmits the audio information to CPU 210. The transmitted audio information is compressed by CPU 210 and is stored in later-described storage device 220. It is also possible that the transmitted audio information may be compressed by CPU 210 and may be transmitted to communication network 110 by later-described communication device 260.

Communication device 260 connects with server 120 via communication network 110. Communication device 260 includes a normal connection maintaining section and an interrupt connection maintaining section, both serving as a communication maintaining unit for maintaining a connection with server 120. Communication device 260 receives a communication report in which a communication information loss state is calculated by later-described communication device 310 of server 120, to thereby detect a data transmission amount in which communication network 110 is capable of communicating.

Storage device 220 stores a streaming transmission application and a phone call application, in addition to the compressed video information and the compressed audio information. The streaming transmission application is started up by the user through input device 230. The streaming transmission application may be started by the user through input device 230, but it may also perform interrupt-starting automatically when receiving a phone call from outside. Also, storage device 220 stores alternative video information and alternative audio information that are used when the interrupt connection maintaining section performs a communication operation. The alternative video information and the alternative audio information are examples of the data other than the information acquired from the sensor.

When the streaming transmission application is started, streaming transmission is started. In the streaming transmission, the video information and the audio information that are compressed by CPU 210 are transmitted to communication network 110 by communication device 260. The connection for the streaming transmission during this time is maintained by the normal connection maintaining section.

When the phone call application is started to make a phone call, the phone call is performed via communication device 260. During this time, in order to make a phone call, the audio information from microphone device 250 is used only for the purpose of the phone call, and it is not used for the streaming transmission. Also, in a phone call such as a video telephone call that uses video and audio, the video information from camera device 240, in addition to the information from microphone device 250, is used only for the phone call, and it is not used for the streaming transmission. That is, when the phone call application is started and a phone call is performed, the streaming transmission application is unable to use camera device 240 or microphone device 250. Thus, when the phone call application is started, continuous transmission of video information or the like by streaming becomes impossible. For this reason, alternative video information or alternative audio information stored in storage device 220 is transmitted to server 120 via communication device 260. The connection for the streaming transmission during this time is maintained by the interrupt connection maintaining section.

Display device 270 and speaker device 280 output video and audio resulting from the streaming transmission application and the phone call application to the user.

1-1-3. Configuration of Server

Figure 3:
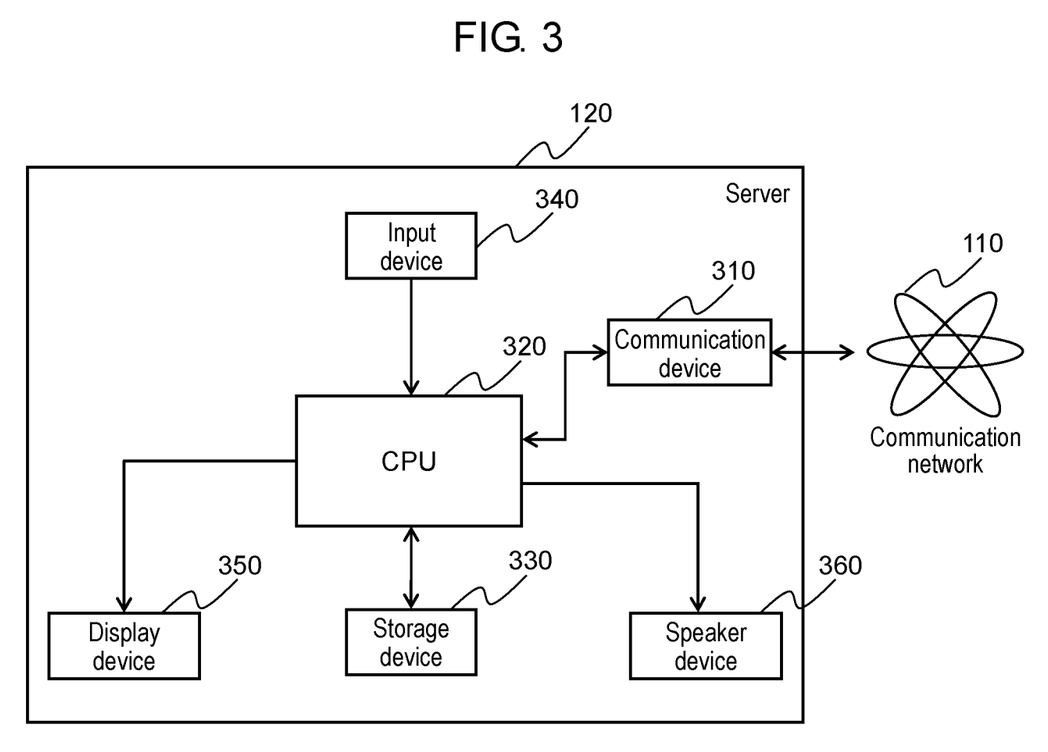
FIG. 3 is a block diagram illustrating the configuration of a server according to the first exemplary embodiment.

The configuration of server 120 according to the first exemplary embodiment will be described with reference to FIG. 3. FIG. 3 is a block diagram illustrating the configuration of server 120 according to the first exemplary embodiment.

CPU 320 performs arithmetic operations based on the information that is input from various devices, and transmits instructions to the devices based on the results of the arithmetic operations. CPU 320 also executes applications stored in later-described storage device 330.

Input device 340 is operated by the user so as to control operations concerning server 120.

Communication device 310 connects with portable terminal 100 via communication network 110. In association with reception of video information and audio information, communication device 310 performs a communication bandwidth estimation process for calculating a communication information loss state and transmits the result as a communication report from communication device 310 to portable terminal 100.

In storage device 330, a streaming reception application is recorded. The streaming reception application is started up by the user through input device 340.

When the streaming reception application is started, streaming reception is started. In the streaming reception, the streaming video (including video information and audio information) transmitted by portable terminal 100 is received.

Display device 350 and speaker device 360 output video and audio resulting from the streaming reception application to the user.

2. Operations

The operations of portable terminal 100 configured in the above-described manner will be described in the following. Portable terminal 100 executes a streaming transmission application. In the following, the operations thereof will be described in more detail.

2-1. Operations of Streaming Transmission Application

Figure 4:
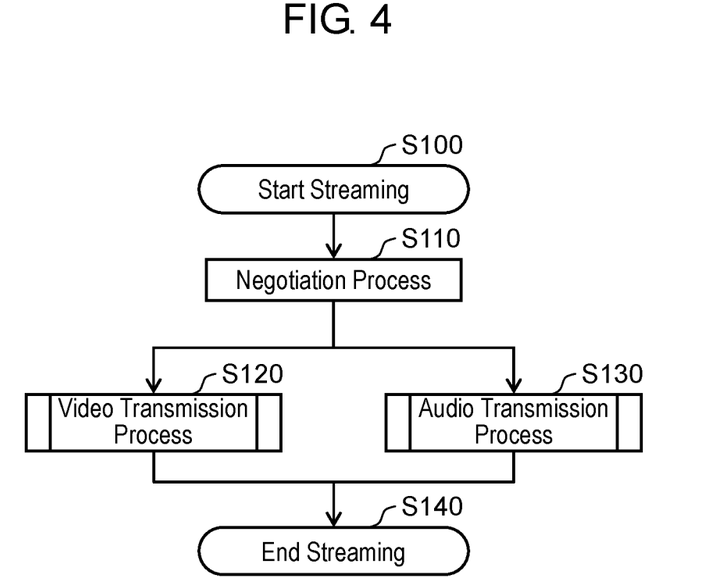
FIG. 4 is a flowchart for illustrating operations of a streaming transmission application of the portable terminal according to the first exemplary embodiment.

FIG. 4 is a flowchart for illustrating operations of a streaming transmission application of portable terminal 100 according to the first exemplary embodiment.

A user operates input device 340 of server 120 to start up the streaming reception application. Next, a user operates input device 230 of portable terminal 100 to start up the streaming transmission application. Server 120 is designated as a communication partner, and streaming is started (S100).

A negotiation process is performed between communication device 260 of portable terminal 100 and communication device 310 of server 120 (S110). Specifically, verification information indicating that both parties are authenticated partners, verification information of the data formats of video information and audio information, and allocation information of one or more communication ports required for transmission and reception of the video information and the audio information are transmitted and received.

Next, portable terminal 100 starts a video transmission process (S120) and an audio transmission process (S130). The details of these processes will be described later.

Server 120 receives video information from portable terminal 100 by means of communication device 310, and reproduces the video information on display device 350. In addition, server 120 receives audio information from portable terminal 100 with communication device 310, and reproduces the audio information with speaker device 360.

When the video transmission process and the audio transmission process finish, the streaming ends (S140).

2-2. Operations of Video Transmission Process

Figure 5:
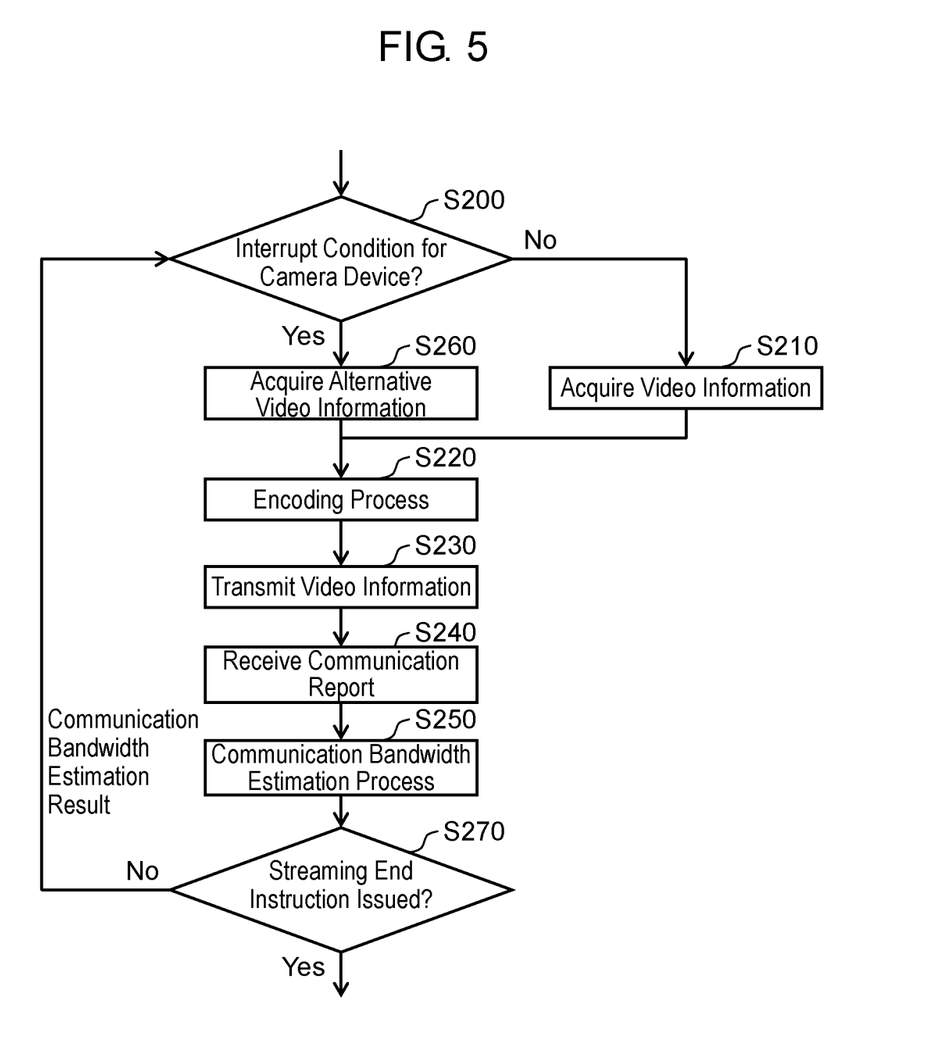
FIG. 5 is a flowchart for illustrating a video transmission process operation of the portable terminal according to the first exemplary embodiment.

FIG. 5 is a flowchart for illustrating operations of a video transmission process (S120 in FIG. 4) of portable terminal 100 according to the first exemplary embodiment.

First, the streaming transmission application determines whether or not an interrupt condition for camera device 240 is produced by a video telephone call (S200). If no interrupt is performed (No in S200), a communication operation is performed by the normal connection maintaining section (S210 to S250). If an interrupt is performed for camera device 240 by a video telephone call (Yes in S200), a communication operation is performed by the interrupt connection maintaining section (S260, S220 to S250).

In the following, the communication operation by the normal connection maintaining section will be described. If no interrupt is performed for camera device 240 by a video telephone call (No in S200), CPU 210 acquires video information from camera device 240 (S210).

Next, CPU 210 performs an encoding process for the video information acquired from camera device 240 (S220), based on the method determined in the negotiation process (S110 in FIG. 4) and the data transmission amount obtained in a communication bandwidth estimation process (later-described S250).

Subsequently, the encoded video information is transmitted from communication device 260 to server 120 (S230).

Next, CPU 210 receives a communication report, which is transmitted from communication device 310 of server 120, via communication device 260 (S240).

Then, CPU 210 performs a communication bandwidth estimation process and determines a data transmission amount to be used for the next encoding process.

Next, the communication operation by the interrupt connection maintaining section will be described. If an interrupt is performed for camera device 240 by a video telephone call (Yes in S200), CPU 210 acquires alternative video information from storage device 220 (S260), in place of acquiring video information from camera device 240. The subsequent processes are the same as the communication operation by the normal connection maintaining section.

After the communication operation by the normal connection maintaining section or the interrupt connection maintaining section, it is determined in portable terminal 100 whether or not a streaming end instruction has been issued from the user (S270). The user can issue a streaming end instruction by operating input device 230. If the end instruction has been issued (Yes in S270), the video transmission process (S120 in FIG. 4) is ended (S140 in FIG. 4). If the end instruction has not been issued (No in S270), the process returns to the interrupt condition determination process for camera device 240 (S200).

It should be noted that, in the communication bandwidth estimation process (S250), a delay time of communication time is calculated by comparing the time point at which portable terminal 100 has transmitted information and the time point at which portable terminal 100 has received the communication report with each other, and also, it is determined whether the data transmission amount used in the present encoding process was appropriate based on the loss information recorded in the communication report, to determine a data transmission amount to be used for the next encoding process.

It should be noted that the alternative video information recorded in storage device 220 may be either a still image or a moving image. It is also possible that the alternative video information may not be the information recorded in storage device 220, but a deep black still image or a certain still image may be dynamically produced and used as the alternative video information.

2-3. Operations of Audio Transmission Process

Figure 6:
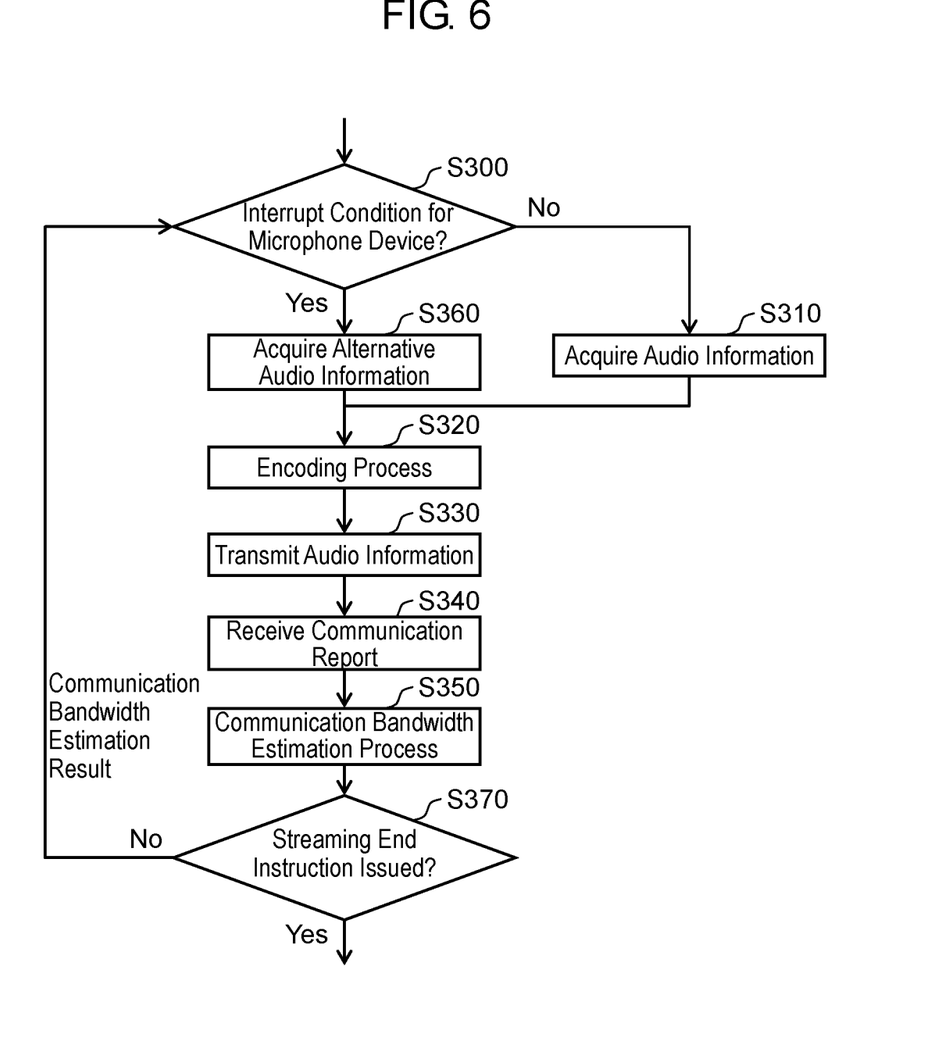
FIG. 6 is a flowchart for illustrating an audio transmission process operation of the portable terminal according to the first exemplary embodiment.

FIG. 6 is a flowchart for illustrating operations of an audio transmission process (S130 in FIG. 4) of portable terminal 100 according to the first exemplary embodiment.

First, the streaming transmission application determines whether or not an interrupt condition for microphone device 250 is produced by a video telephone call or a phone call (S200). If no interrupt is performed (No in S300), a communication operation is performed by the normal connection maintaining section (S310 to S350). If an interrupt is performed for microphone device 250 by a video telephone call or a phone call (Yes in S300), a communication operation is performed by the interrupt connection maintaining section (S360, S320 to S350).

In the following, the communication operation by the normal connection maintaining section will be described. If no interrupt is performed for microphone device 250 by a video telephone call or a phone call (No in S300), CPU 210 acquires audio information from microphone device 250 (S310).

Next, CPU 210 performs an encoding process for the audio information acquired from microphone device 250 (S320), based on the method determined in the negotiation process (S110 in FIG. 4) and the data transmission amount obtained in a communication bandwidth estimation process (later-described S350).

Subsequently, the encoded audio information is transmitted from communication device 260 to server 120 (S330).

Next, CPU 210 receives a communication report, which is transmitted from communication device 310 of server 120, via communication device 260 (S340).

Then, CPU 210 performs a communication bandwidth estimation process and determines a data transmission amount to be used for the next encoding process.

Next, the communication operation by the interrupt connection maintaining section will be described. If an interrupt is performed for microphone device 250 by a video telephone call or a phone call (Yes in S300), CPU 210 acquires alternative audio information from storage device 220 (S360), in place of acquiring audio information from microphone device 250. The subsequent processes are the same as the communication operation by the normal connection maintaining section.

After the communication operation by the normal connection maintaining section or the interrupt connection maintaining section, it is determined in portable terminal 100 whether or not a streaming end instruction has been issued from the user (S370). The user can issue a streaming end instruction by operating input device 230. If the end instruction has been issued (Yes in S270), the audio transmission process (S130 in FIG. 4) is ended (S140 in FIG. 4). If the end instruction has not been issued (No in S370), the process returns to the interrupt condition determination process for microphone device 250 (S300).

It should be noted that, in the communication bandwidth estimation process (S350), a delay time of communication time is calculated by comparing the time point at which portable terminal 100 has transmitted information and the time point at which portable terminal 100 has received the communication report with each other, and also, it is determined whether the data transmission amount used in the present encoding process was appropriate based on the loss information recorded in the communication report, to determine a data transmission amount to be used for the next encoding process.

It is also possible that the alternative audio information recorded in the storage device 220 may not be the information recorded in storage device 220, but silent audio information or certain audio information may be dynamically produced and used as the alternative audio information.

2-4. Examples of Operations of Various Apparatuses

Figure 7:
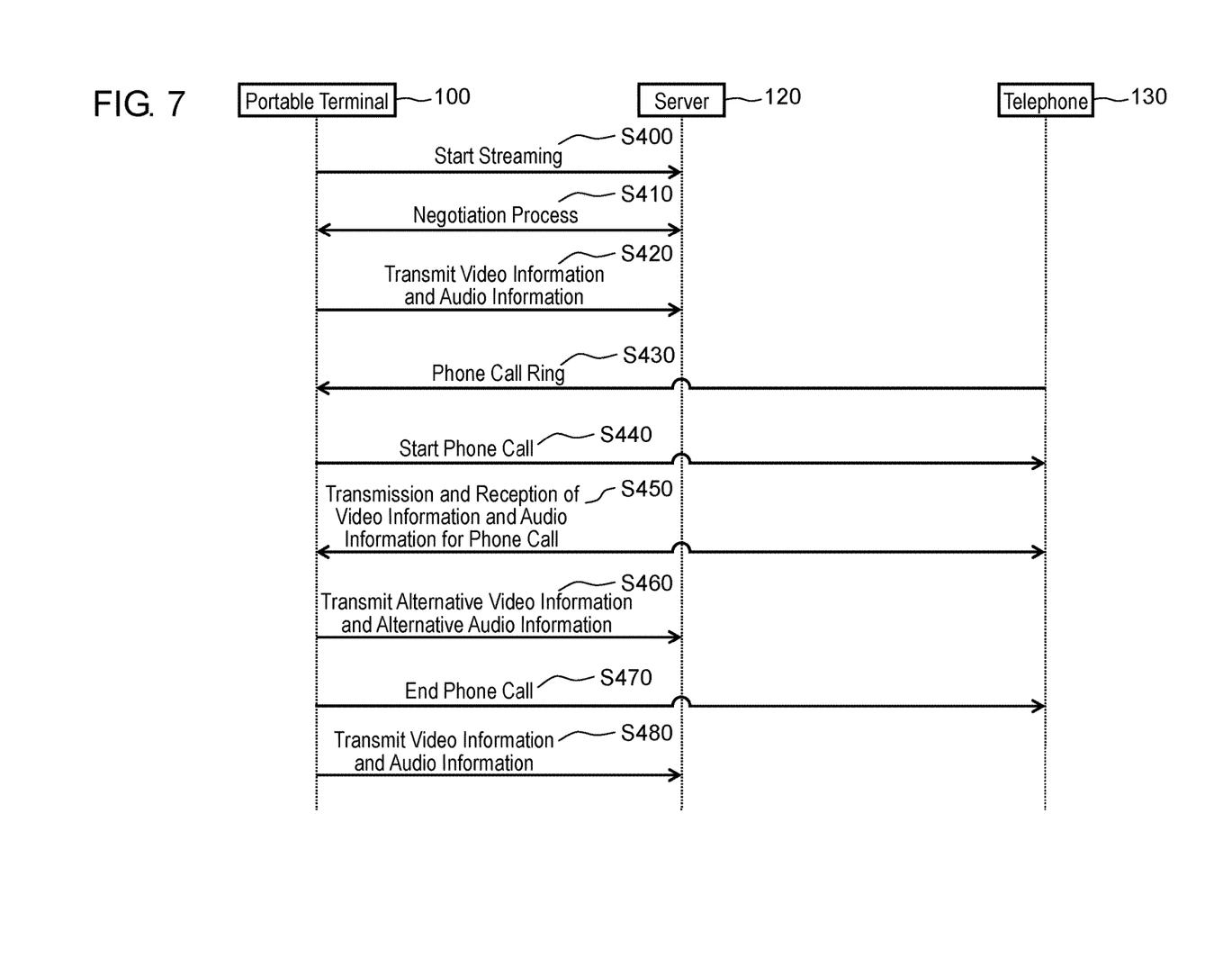
FIG. 7 is a view illustrating an example of communication of the portable terminal according to the first exemplary embodiment.

FIG. 7 is a view illustrating an example of communication between various apparatuses according to the first exemplary embodiment.

First, a user starts up the streaming reception application by operating input device 340 of server 120. Next, the user starts up the streaming transmission application by operating input device 230 of portable terminal 100, to designate server 120 as a communication partner and start streaming (S400).

A negotiation process is performed between communication device 260 of portable terminal 100 and communication device 310 of server 120 (S410).

Next, the streaming transmission application of portable terminal 100 starts a video transmission process and an audio transmission process. Because no phone call is made by telephone 130 at this time, communication device 260 transmits video information acquired from camera device 240 and audio information acquired from microphone device 250 to server 120 (S420). In this case, the video transmission process and the audio transmission process are carried out by the communication operation of the normal connection maintaining section.

Next, ringing for starting a phone call is performed from telephone 130 to portable terminal 100 (S430). At this time, the phone call application is started in portable terminal 100, and a phone call is started (S440). During the phone call, the phone call application acquires audio information for the phone call from microphone device 250, and performs transmission and reception of the audio information for the phone call with telephone 130 via communication device 260 (S450). When this phone call application is compatible with a video telephone function, the phone call application also acquires video information for the phone call from camera device 240, and also performs transmission and reception of the audio information for the phone call with telephone 130 via communication device 260.

At that time, the streaming transmission application of portable terminal 100 determines that an interrupt condition for microphone device 250 or camera device 240 has occurred. Accordingly, the communication device 260 continues to transmit the alternative video information or the alternative audio information stored in storage device 220 to server 120 (S460). In this case, the video transmission process and the audio transmission process are carried out by the communication operation of the interrupt connection maintaining section.

Next, the user ends the phone call (S470). When the phone call is ended, the streaming transmission application of portable terminal 100 determines that there is no interrupt condition for microphone device 250 or camera device 240. As a result, communication device 260 resumes transmission of the video information acquired from camera device 240 and the audio information acquired from microphone device 250 to server 120 (S480). In this case, the video transmission process and the audio transmission process are carried out by the communication operation of the normal connection maintaining section.

Even during the time in which information cannot be acquired from camera device 240 or microphone device 250 because of an interrupt by the phone call application, the communication is properly continued by the process of the interrupt connection maintaining section, when viewed from server 120. Therefore, the negotiation process (S410) is unnecessary when the process switches to the communication operation of the normal connection maintaining section.

Moreover, the data transmission amount to be used for the encoding process (S220 in FIG. 4 and S320 in FIG. 5) in the communication for the first time after the process has been switched to the transmission process of the normal connection maintaining section is a data transmission amount that is calculated when the last communication is performed in the transmission process of the interrupt connection maintaining section. This makes it possible to instantly resume the streaming transmission after completion of the interrupt with the highest quality encoding setting with which video information and audio information can be transmitted.

3. Advantageous Effects, Etc.

As described above, in the present exemplary embodiment, even when an interrupt occurs, portable terminal 100 is able to instantly resume normal communication without necessitating the negotiation process again. Moreover, usability experienced by the user is improved because the highest quality encoding setting is instantly available when normal streaming transmission is resumed.

Other Exemplary Embodiments

Hereinabove, the first exemplary embodiment has been described as an example of the technology disclosed in the present application. However, the technology of the present disclosure is not limited thereto and may be appropriately applied to other embodiments in which modifications, substitutions, additions, and subtractions are made. It is also possible to construct other embodiments by combining various component parts described in the foregoing first exemplary embodiment.

The first exemplary embodiment describes a case in which, while portable terminal 100 is carrying out streaming transmission to server 120, incoming call reception occurs from telephone 130 so that an interrupt occurs for camera device 240 and microphone device 250. The interrupt may occur either one of camera device 240 or microphone device 250. This means that the interrupt is not limited to incoming call reception. For example, in cases where an alarm indicating a specific time is set on the portable terminal, the alarm goes off when the specified time is reached during streaming transmission. In this case, it is considerably inappropriate that the audio information from microphone device 250 is transmitted by streaming, so it is possible to determine that an interrupt condition for microphone device 250 has occurred.

The first exemplary embodiment has been described with the assumption that an interrupt occurrence can be determined from an application. Whether or not an interrupt condition can be acquired from an application depends on the specification of the operating system of the portable terminal. The determination of an interrupt occurrence in the present disclosure may be performed by determining whether valid information can be acquired from a sensor device. Therefore, in place of acquiring an interrupt condition itself, it is possible to determine that an interrupt condition has occurred by the fact that valid information cannot be acquired from a sensor device for a predetermined time.

The first exemplary embodiment has described cases in which streaming transmission is performed for video information and audio information. The process of the interrupt connection maintaining section caused by an interrupt occurrence determination is also effective for information other than video and audio. For example, the present disclosure is applicable to handle an interrupt for various kinds of sensors such as when the positional information, tilt information, and temperature information of a portable terminal are continuously transmitted to a server. The positional information, tilt information, and temperature information of a portable terminal are examples of the information inside the apparatus. Furthermore, similar embodiments are also possible when an interrupt condition occurs for an external device, not the sensors incorporated in the portable terminal itself, which is connected to the portable terminal using USB connection, for example.

It will be appreciated that the foregoing exemplary embodiments merely illustrate the technology of the present disclosure, and therefore, various modifications, substitutions, additions, and subtractions may be made within the scope of the claims and equivalents thereof.

INDUSTRIAL APPLICABILITY

The present disclosure is applicable to a streaming apparatus in which an interrupt makes information acquisition from a sensor device impossible. Specifically, the present disclosure is applicable to, for example, a smartphone.

What is claimed is:
1. An information communication apparatus comprising:
a sensor configured to acquire information;
a storage configured to store a first application and a second application different from the first application, the first application configured for transmitting the information from the sensor to a server via a communication network, the second application configured for using the sensor; and
a processor configured to execute the first and the second application,
wherein, while the first application is executed:
when the second application is not executed, the processor is configured to execute the first application for transmitting data of the information from the sensor to the server, and
when the second application is executed, the processor:
executes the first application to (i) stop the transmission of the data of the information from the sensor to the server by the first application, and (ii) transmit data, by the first application, other than the information from the sensor, to the server to maintain a connection with the server; and
executes the second application to use the sensor by the second application.

2. The information communication apparatus according to claim 1, wherein, when the processor is unable to acquire by the first application, for a predetermined time, the information from the sensor, the processor transmits the data other than the information from the sensor to the server.

3. The information communication apparatus according to claim 1, wherein:

the sensor is a camera device; and
the information is video information from the camera device.

4. The information communication apparatus according to claim 1, wherein:
the sensor is a microphone device; and
the information is audio information from the microphone device.

5. The information communication apparatus according to claim 1, wherein the processor:
detects a communication bandwidth between the sensor and the server;
determines a data transmission amount of the data other than the information from the sensor to the server based on a detection result of the communication bandwidth; and
determines a data transmission amount of the data of the information from the sensor transmitted by the first application based on the data transmission amount of the data other than the information from the sensor to the server when acquisition of the information from the sensor corresponding to the continuous transmission has become possible.

6. The information communication apparatus according to claim 1, wherein
the connection is a streaming connection.

7. The information communication apparatus according to claim 1, wherein when the second application is executed, the processor makes the first application unable to use the sensor while the second application is using the sensor.

8. An information communication method comprising:
acquiring information with a sensor;
storing a first application and a second application different from the first application, the first application configured for transmitting the information from the sensor to a server via a communication network, the second application configured for using the sensor; and
executing the first and the second application,
wherein, while the first application is executed:
when the second application is not executed, executing the first application for transmitting data of the information from the sensor to the server, and
when the second application is executed:
executing the first application to (i) stop the transmission of the data of the information from the sensor to the server by the first application, and (ii) transmit data, by the first application, other than the information from the sensor, to the server to maintain a connection with the server; and
executing the second application to use the sensor by the second application.

9. The information communication method according to claim 8, wherein
the connection is a streaming connection.

10. The information communication method according to claim 8, further comprising making the first application unable to use the sensor while the second application is using the sensor.

* * * * *